UNITED STATES PATENT OFFICE.

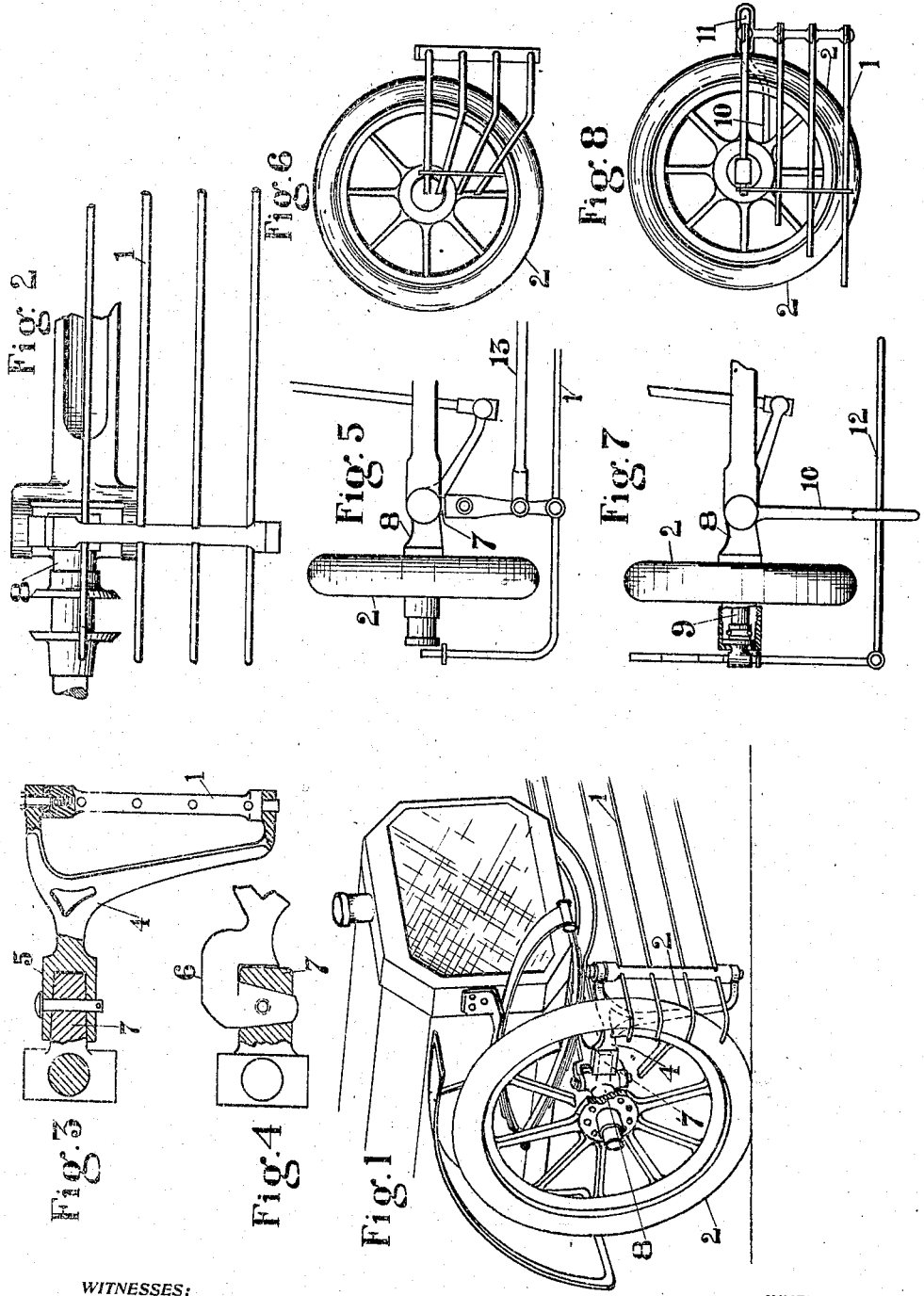

AUGUSTUS W. SHANK, OF DETROIT, MICHIGAN, ASSIGNOR, BY DIRECT AND MESNE ASSIGNMENTS, OF ONE-HALF TO GEORGE ROTTMAN, ONE-EIGHTH TO GEORGE W. LYNN, AND ONE-EIGHTH TO WILLIAM W. TACKABURY, ALL OF DETROIT, MICHIGAN.

FENDER.

942,290.

Specification of Letters Patent. Patented Dec. 7, 1909.

Application filed February 13, 1909. Serial No. 477,611.

*To all whom it may concern:*

Be it known that I, AUGUSTUS W. SHANK, a citizen of the United States of America, residing at Detroit, in the county of Wayne and State of Michigan, have invented certain new and useful Improvements in Fenders, of which the following is a specification, reference being had therein to the accompanying drawings.

This invention relates to fenders for automobiles and like vehicles, and more especially to an arrangement thereof whereby the fender is maintained in front of the forward or steering wheels regardless of any angular position they assume.

The invention consists in the matters hereinafter set forth, and more particularly pointed out in the appended claims.

In the drawings, Figure 1 is a view of the front portion of an automobile equipped with a fender embodying features of the invention. Fig. 2 is a view in front elevation showing the fender, together with a front axle and steering knuckle. Fig. 3 is a view in detail showing a supporting bracket for attaching the fender to a vehicle. Fig. 4 is a view in detail showing a modified form of supporting bracket. Figs. 5 and 6 are views in detail showing a different arrangement of the fender. Figs. 7 and 8 are views in detail showing another way of attaching the fender to the vehicle.

Referring to the drawings, an apron or shield 1 of appropriate shape to extend across the front of a vehicle body and of open wood or metal work as herein illustrated, or of netting, cloth or the like, on a suitable frame, is supported in an upright position just ahead of the forward steering bearing wheels 2 of a vehicle by brackets 4. The latter are pivoted or hinged to the shield at their outer ends, and are preferably detachably secured in any convenient manner, as by socket and pin connections indicated at 5 in Fig. 3, or by hooks 6 in Fig. 4, to the members of the running gear which swing with the wheels on the knuckle joints of the front axle. Preferably the brackets are fastened to lugs 7 extending from the movable members 8 of the steering knuckles, or they may be attached to the stub shafts 9 as shown in Fig. 7, in which case bearing rods 10 extend from the knuckles with guide slots 11 in which a horizontal member 12 of the fender plays. Another method of securing the fender is to fasten the brackets directly to the link 13 which connects the steering knuckle arms, if the link is forward of the axle. The shield may be extended around the wheels if preferred. By this arrangement, the fender maintains parallel relation to the forward axle while at the same time it is swung back and forth so that it always covers the wheels, the inner one of which, in turning a corner, would otherwise be unprotected if the fender was rigid with the front of the body unless the shield was a great deal wider than the vehicle itself.

Obviously, changes in the details of construction may be made without departing from the spirit of the invention, and I do not care to limit myself to any particular form or arrangement of parts.

What I claim as my invention is:—

1. A fender for an automobile comprising in combination with the steering bearing wheels and members of the running gear which swing with the said wheels, supporting brackets secured to said members, and a shield in front of said wheels pivotally supported on the brackets.

2. A fender for an automobile comprising a shield adapted to span the steering bearing-wheels of the vehicle, and brackets pivotally attached to the shield and adapted to be secured at their inner ends to the portions of the running gear which swing with the wheels.

3. The combination with the steering bearing-wheels of an automobile and the portion of the running gear which swings therewith of a fender consisting of supporting members detachably secured to the said portion of the gear and a shield in front of the said wheels secured on said supporting members.

In testimony whereof I affix my signature in presence of two witnesses.

AUGUSTUS W. SHANK.

Witnesses:
C. R. STICKNEY.
OTTO F. BARTHEL.